US012657090B2

(12) United States Patent
Goyal et al.

(10) Patent No.: US 12,657,090 B2
(45) Date of Patent: Jun. 16, 2026

(54) BACKUP MANAGEMENT OF DATABASE LOGS

(71) Applicant: Rubrik, Inc., Palo Alto, CA (US)

(72) Inventors: Abhishek Goyal, Bengaluru (IN);
Ashish Kumar, Bengaluru (IN); Jayant Kumar Tanwani, Bengaluru (IN);
Kunal Vallecha, Bengaluru (IN);
Vishnu Vardhan Itta, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/771,909

(22) Filed: Jul. 12, 2024

(65) Prior Publication Data

US 2026/0017147 A1 Jan. 15, 2026

(51) Int. Cl.
*G06F 16/00* (2019.01)
*G06F 11/1446* (2026.01)
*G06F 16/27* (2019.01)

(52) U.S. Cl.
CPC .......... *G06F 11/1458* (2013.01); *G06F 16/27* (2019.01); *G06F 2201/80* (2013.01)

(58) Field of Classification Search
CPC .......................... G06F 11/1458; G06F 2201/80
USPC ....................................................... 707/648
See application file for complete search history.

(56) References Cited

U.S. PATENT DOCUMENTS

| | | | | |
|---|---|---|---|---|
| 7,937,545 | B1 * | 5/2011 | Wu ..................... | G06F 11/1448 |
| | | | | 709/219 |
| 11,500,664 | B2 * | 11/2022 | Meadowcroft ..... | G06F 11/2097 |
| 11,663,092 | B2 * | 5/2023 | Meadowcroft ..... | G06F 11/2035 |
| | | | | 707/649 |
| 2019/0034284 | A1 * | 1/2019 | Mohanta ................. | G06F 3/067 |
| 2020/0349030 | A1 * | 11/2020 | Meadowcroft ..... | G06F 11/1471 |
| 2022/0374519 | A1 * | 11/2022 | Botelho .............. | G06F 11/1464 |
| 2024/0160534 | A1 * | 5/2024 | Itta ..................... | G06F 11/1469 |

* cited by examiner

*Primary Examiner* — Monica M Pyo
(74) *Attorney, Agent, or Firm* — Holland & Hart LLP

(57) ABSTRACT

Methods, systems, and devices for data management are described. A data management system (DMS) may provide backup and recovery services for customer computing systems or databases. The DMS may implement an active/passive partition scheme to enable reception of log files in a push manner and avoid frequent building and teardown of the stack to back up the database. The DMS may implement two storage partitions which alternate between an active and passive state. Received log files may be stored temporarily in a first storage partition in the active state. Once the first storage partition is transitioned to the passive state, the DMS may capture a snapshot of the storage partition and may store the snapshot. When the first storage partition is transitioned to the passive state, the second storage partition may be transitioned to the active state so that the DMS may continue to receive log files.

16 Claims, 10 Drawing Sheets

200

Active State 305

Passive State 310

Cleanup State 315

300

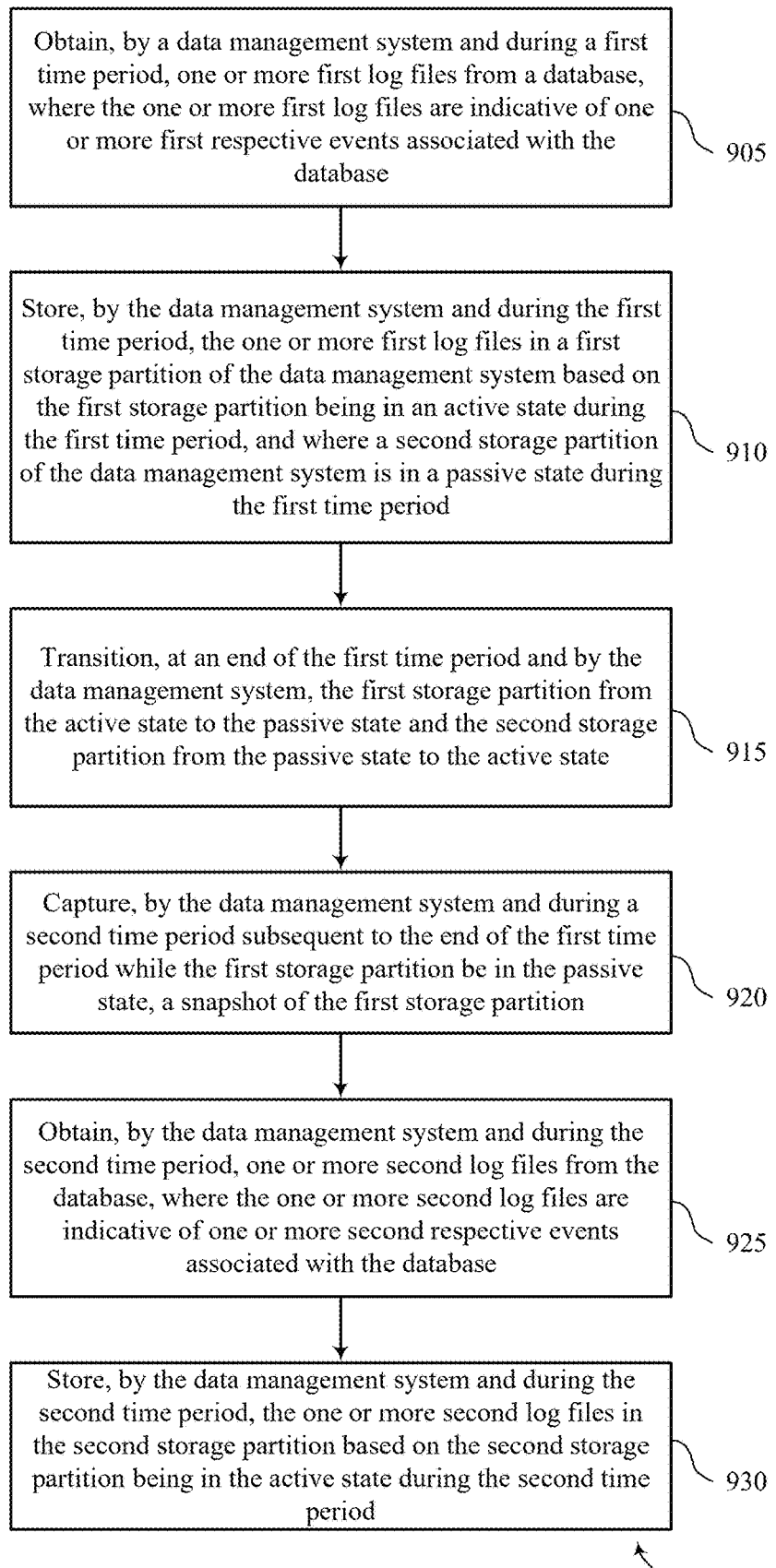

Obtain, by a data management system and during a first time period, one or more first log files from a database, where the one or more first log files are indicative of one or more first respective events associated with the database ⟍ 905

Store, by the data management system and during the first time period, the one or more first log files in a first storage partition of the data management system based on the first storage partition being in an active state during the first time period, and where a second storage partition of the data management system is in a passive state during the first time period ⟍ 910

Transition, at an end of the first time period and by the data management system, the first storage partition from the active state to the passive state and the second storage partition from the passive state to the active state ⟍ 915

Capture, by the data management system and during a second time period subsequent to the end of the first time period while the first storage partition be in the passive state, a snapshot of the first storage partition ⟍ 920

Obtain, by the data management system and during the second time period, one or more second log files from the database, where the one or more second log files are indicative of one or more second respective events associated with the database ⟍ 925

Store, by the data management system and during the second time period, the one or more second log files in the second storage partition based on the second storage partition being in the active state during the second time period ⟍ 930

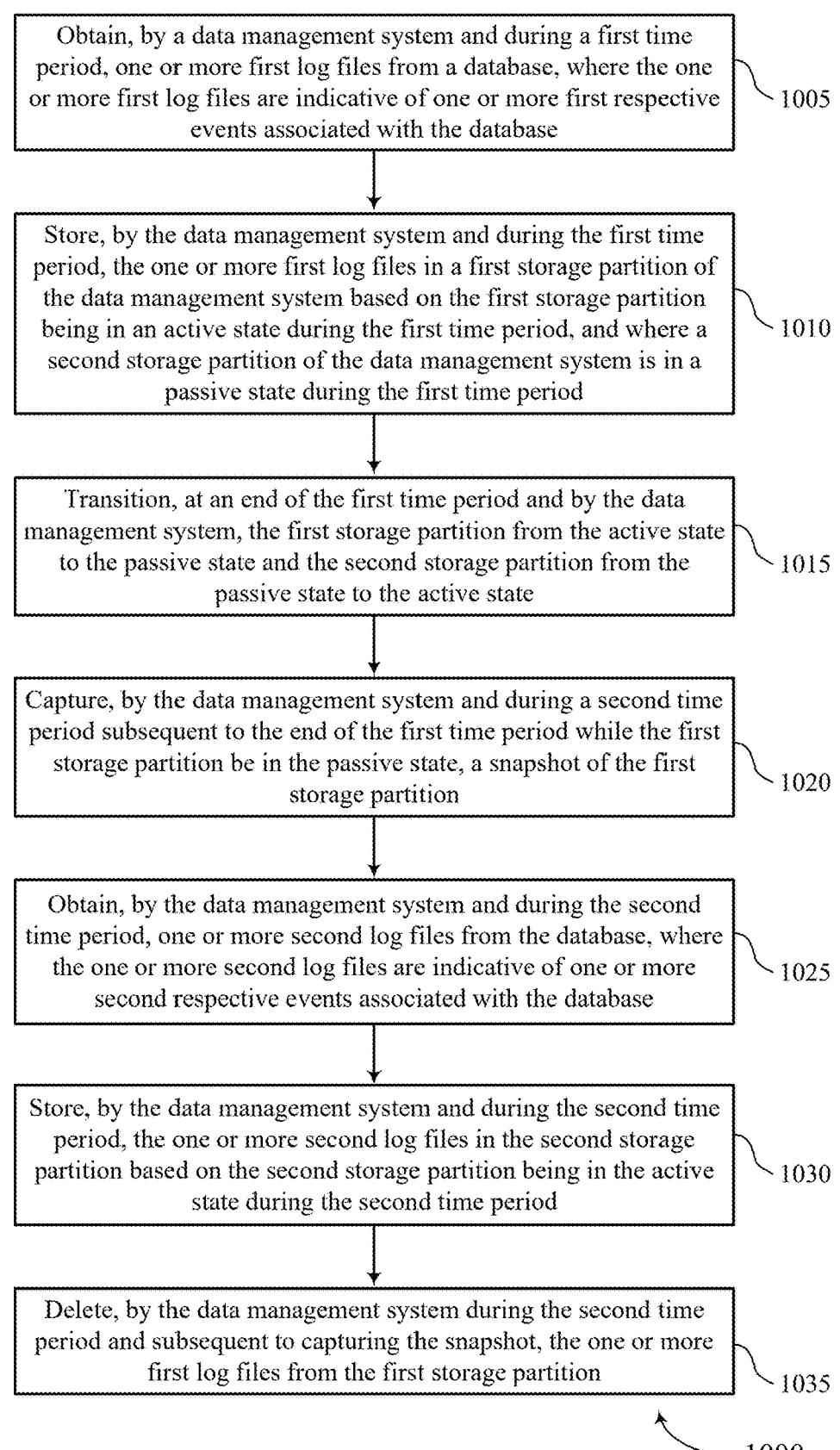

Obtain, by a data management system and during a first time period, one or more first log files from a database, where the one or more first log files are indicative of one or more first respective events associated with the database — 1005

Store, by the data management system and during the first time period, the one or more first log files in a first storage partition of the data management system based on the first storage partition being in an active state during the first time period, and where a second storage partition of the data management system is in a passive state during the first time period — 1010

Transition, at an end of the first time period and by the data management system, the first storage partition from the active state to the passive state and the second storage partition from the passive state to the active state — 1015

Capture, by the data management system and during a second time period subsequent to the end of the first time period while the first storage partition be in the passive state, a snapshot of the first storage partition — 1020

Obtain, by the data management system and during the second time period, one or more second log files from the database, where the one or more second log files are indicative of one or more second respective events associated with the database — 1025

Store, by the data management system and during the second time period, the one or more second log files in the second storage partition based on the second storage partition being in the active state during the second time period — 1030

Delete, by the data management system during the second time period and subsequent to capturing the snapshot, the one or more first log files from the first storage partition — 1035

BACKUP MANAGEMENT OF DATABASE LOGS

FIELD OF TECHNOLOGY

The present disclosure relates generally to data management, including techniques for backup management of database log files.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 9 and 10 show flowcharts illustrating methods that support backup management of database log files in accordance with aspects of the present disclosure.

DETAILED DESCRIPTION

Figure 1:
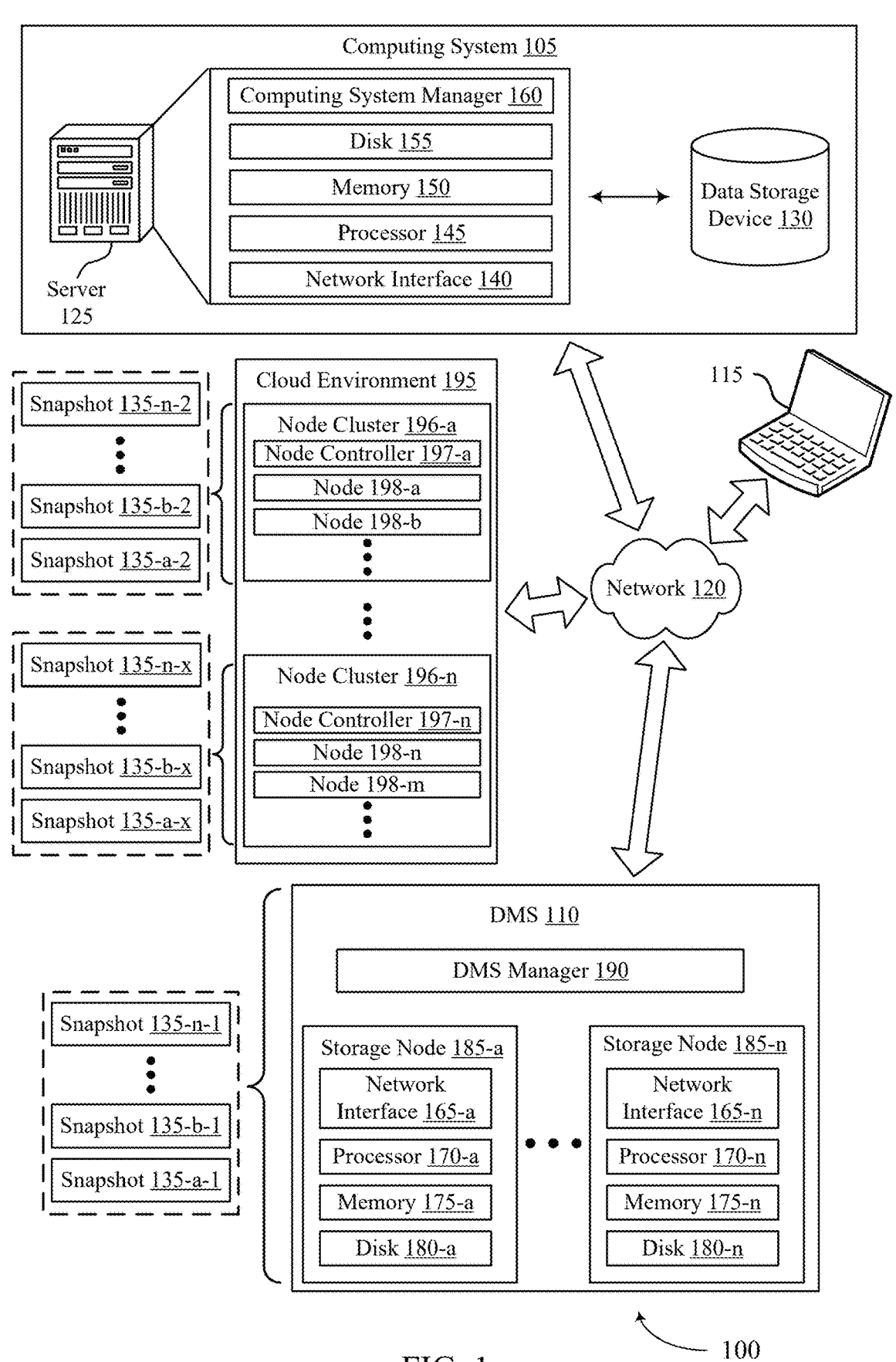
FIG. 1 illustrates an example of a computing environment that supports backup management of database log files in accordance with aspects of the present disclosure.

A data management system (DMS) may include various nodes, clusters, and sub-systems that provide backup and recovery services for customer computing systems or databases. Different snappable types may be built for the DMS to provide backup and recovery services for particular databases or applications. A managed volume ("MV") solution may be used with databases and applications without dedicated snappables. For example, the MV solution may be database agnostic and may use tools such as portable operating system interface (POSIX), network file system (NFS), shell scripting, and curl. Implementation of a MV solution may involve customer devised scripts to capture backups of customer databases or computing objects at specified frequencies (e.g., daily, weekly, monthly). Customers may also desire to capture backups of the database logs files which are generated by a database and indicate change events at the database. For example, log files may indicate which files or entries in the database are modified, deleted, or added and/or the modifications to the files. Accordingly, log files may be combined with periodic snapshots of a database to perform a recovery to a point in time between the periodic snapshots. Database log files may be generated frequently and may be purged from the database as new database log files are generated. For example, to back up log files, a customer may capture snapshots of log files every 15 minutes. Such frequent capturing of log files by a DMS, however, may involve frequent stack build and teardown at the DMS to access the database. Further, use of a same procedure and frequency to capture log files and snapshots of the database may result in missed snapshots, as the process to capture snapshots may involve more than 15 minutes.

In some aspects, the DMS may receive log files from the database in a push manner as the log files are generated. Accordingly, log files may not be missed by the DMS and the recovery point objective (RPO) for the database may be reduced. The DMS may implement an active/passive partition scheme to enable reception of log files in a push manner and to avoid frequent building and tearing down of the stack to back up the database. For a given database, the DMS may implement two storage partitions which alternate (e.g., every x time period, where x may be minutes, hours, or days) between an active state and a passive state. Received log files may be stored temporarily in a first storage partition in the active state. After the first storage partition is transitioned to the passive state, the DMS may capture a snapshot of the storage partition and may store the snapshot, and accordingly the log files stored on the storage partition may be captured and stored in secondary storage (e.g., along with snapshots of the database). When the first storage partition is transitioned to the passive state, the second storage partition may be transitioned to the active state so that the DMS may continue to ingest log files from the database and store the ingested log files in the second storage partition. Once the snapshot of the first storage partition is captured, the DMS may clear the resources of the first storage partition in order to enable storage of new log files in the first storage partition once the first storage partition is transitioned back to the active state.

FIG. 1 illustrates an example of a computing environment 100 that supports backup management of database log files in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Building backup solutions for multiple databases may involve large development processes and effort. Solutions that lower recovery RPO may be more difficult as reducing RPO may involve backing up log files generated by databases (e.g., as compared to periodic snapshots such as the snapshots 135). For example, unlike data backups via base or incremental snapshots 135, backing up log files may demand continuous streaming of files, a generic interface to ingest the log files, and snapshotting and efficient data management of the ingested log files.

In some examples, the DMS 110 may provide data protection services (e.g., backup and recovery services) for computing objects (e.g., for the computing system 105) in the form of a snappable. A snappable may be built to work with a particular computing object or computing object type, such as a database or application. A snappable may include infrastructure such as scripts and network connection for the DMS 110 to access a customer computing object. Computing objects without a dedicated snappable may use MV to provide data protection services, where MV may provide a "catch-all" solution. Snappables may be database-aware, while MV may be database-agnostic and may use tools such as POSIX, NFS, shell scripting, and curl for ease of use by customers and to involve fewer remote host dependencies. Two variants of MV may be available, legacy MV and service level agreement (SLA) MV. In both legacy MV and SLA MV, MV exposes a storage location as an NFS share on which customer scripts or applications (e.g., scripts or applications associated with a database of a given customer of the DMS 110) ingest the data from the database. Once the data is ingested into the storage location, the data may be snapshotted (e.g., the DMS 110 may capture a snapshot of the ingested data) and therefore attain immutability upon storage at a secondary storage environment. For example, the DMS 110 may store the snapshotted data in a secondary storage environment such as the storage nodes 185 or the node clusters 196 as described herein. An NFS share may be available in read-write mode per an SLA or on-demand through an application programming interface (API) in legacy MV. Otherwise, the NFS share may either not be available at all in SLA MV or may be available in read-only mode in the case of legacy MV.

Customers of the DMS 110 may use MV for different applications and in different ways. For example, MV may be used for data protection services for databases. Protection services for databases may involve support of different types of backups associated with different SLAs. For example, SLAs may define database full backups (e.g., base snapshots 135) at a first periodicity (e.g., daily, weekly, monthly), database incremental or delta backups (e.g., incremental snapshots 135) at a second periodicity (e.g., hourly or daily), and/or database log backups (e.g., backups of log files) at a third periodicity (e.g., every x minutes, such as every 15 minutes). Customers of the DMS 110 and/or an administrator of the DMS 110 may write scripts to perform such backups at the indicated periodicities and may configure MV with such scripts. MV may provide full and incremental data backups of a database with the indicated SLA, but log file backups may involve several challenges.

For example, a customer of the DMS 110 may create an MV for each database for which the customer wants to provide data protection services. Data backup (e.g., full and incremental snapshots of the database) and log file backups may be selected to be performed on a given MV with an aggressive SLA. For example, to protect a database of 100 terabytes (TBs), a customer may create an MV of 300 TBs with a customer provided script and a backup SLA, where the SLA may be configured for backup every 30 minutes so that the customer provided backup script can capture log file backups every 30 minutes, daily incremental backups, and weekly full backups. Such a deployment model, however, may risk SLA misses (e.g., missing a scheduled snapshot or capturing a snapshot later than scheduled), backup inefficiency, and higher RPO. For example, the time for stack build and tear down at the MV size of 300 TB to capture such backups from the database may be high (e.g., longer than 30 minutes). Additionally, or alternatively, snapshot conversions from ingested data using patch file conversion (PFC) (e.g., converting ingested data to patch files for storage in a secondary storage environment) may take longer than 30 minutes at a 300 TB MV size, and thus the queue size for PFC may build up leading to SLI misses and higher RPO. Additionally, or alternatively, frequent reverse/consolidate background operations may be triggered due to a long chain at the blobstore layer, which may lead to inefficient usage of computing resources of the DMS 110 such as disk operations or CPU. The blobstore layer may manage how data is stored in the secondary storage environment including linking incremental snapshots and log files (e.g., in a recovery chain) to enable point in time recovery. For example, the blobstore layer may represent snapshots as patch file images which indicate keys (logical offsets) for storage locations of data blocks that contain the data in each snapshot.

In some examples, to achieve RPO of less than 30 minutes, a customer of the DMS 110 may create multiple MVs for the same database, where one MV may be used for log file backups and another MV may be used for data backup. Such a multi-MV implementation, however, may result in high operational overhead for the customers of the DMS 110. For example, to protect a database of 100 TBs, a customer may create an MV of 250 TB for data backups and an MV of 50 TBs for log file backups. Although the MV may support an aggressive SLA of 30 minutes for a 50 TB MV with specific configurations, such an implementation may still involve frequent stack build and teardown (e.g., every 30 minutes) for the log file backup MV. Such an implementation also may involve long snapshot chains and inability to scale to support more aggressive SLAs (e.g., less than 15 minutes to achieve an RPO of less than 15 minutes).

Different types of database backups (e.g., data backups and log file backups) may have different SLA demands, input/output (IO) patterns, and data access patterns. Despite the differences, MV may use the same stack for the different types of database backups. For example, such differences may include SLA demands, where the SLA demand may be more aggressive for log files than for data backups. For example, customers of the DMS 110 may demand an RPO of 5 minutes. As another example, the size of ingested log files may be in the range of a few megabytes (MBs) to a few gigabytes (GBs), and once a log file is ingested, the DMS 110 may not perform read or write operations on the log file during backup of the log file (e.g., operations to store the log file in a secondary storage environment). With respect to data backups, however, the size of data files (e.g., snapshots of a database) may range from a few hundred GBs to several TBs, and data that is ingested for data backups may be read or updated based on backup application demands. The IO pattern for log file ingestion may involve small or large read or write IOs at random offsets. To achieve better RPO, triggering of ingestion of log files and data backups may be different. For example, data backups of databased may be triggered through a command line interface (CLI) and may be ingested to a backup share location based on the command (e.g., in a pull model initiated by the DMS), while backups of log files may involve cases where the databases push the log files as the log files are created to the backup share location (e.g., a push model) which can achieve better RPO. For example, log files may be stored at a location at the database with a fixed memory size, and accordingly, the database may purge older log files as new log files are generated. Thus, obtaining log files from a database in a pull manner risks missing log files which are purged from the database before the log files are obtained by the DMS 110.

As another example, customer scripts for MV may manage the space on the MV mount (e.g., the temporary storage space at the DMS 110 prior to transferring the backup data to a secondary storage location) by removing older backups to make space for new backups. Thus, using the same stack for data backup and log file backup of a database may lead to higher RPO, SLA misses, inefficiency involved with frequent stack build and teardown, use of the same backup space management for log files and data backups which have very different sizes, and generally attempting to force fit the same stack structure for the different types of database backups.

In some aspects, as described herein, the DMS 110 implement separate backup solutions for databases. For example, an MV may be used to capture data backups of a database (e.g., in a scheduled pull manner), and the DMS 110 may receive log files from the database in a push manner as the log files are generated. For example, the DMS 110 may enable applications to read/write using POSIX in a non-disruptive manner at all times (e.g., always-on) for IO or data access patterns of log file backups. Accordingly, log files and data backups of the database may not be missed by the DMS 110, and RPO may be reduced. The DMS 110 may implement an active/passive storage partition scheme to enable reception of log files in a push manner and avoid frequent building and tearing down of the stack to back up the database. For a given database, the DMS 110 may implement two storage partitions which alternate (e.g., every x time period, where x may be minutes, hours, or days) between an active state and a passive state. Received log files may be stored temporarily in a first storage partition in the active state. Once the first storage partition is transitioned to the passive state, the DMS 110 may capture a snapshot of the storage partition and may store the snapshot, and accordingly the log files stored on the storage partition may be captured and stored in secondary storage (e.g., along with snapshots of the database). When the first storage partition is transitioned to the passive state, the second storage partition may be transitioned to the active state so that the DMS 110 may continue to receive log files from the database and store the received log files in the second storage partition. Once the snapshot of the first storage partition is captured, the DMS 110 may clear the resources of the first storage partition in order to enable storage of new log files in the first storage partition once the first storage partition is transitioned back to the active state.

Figure 2:
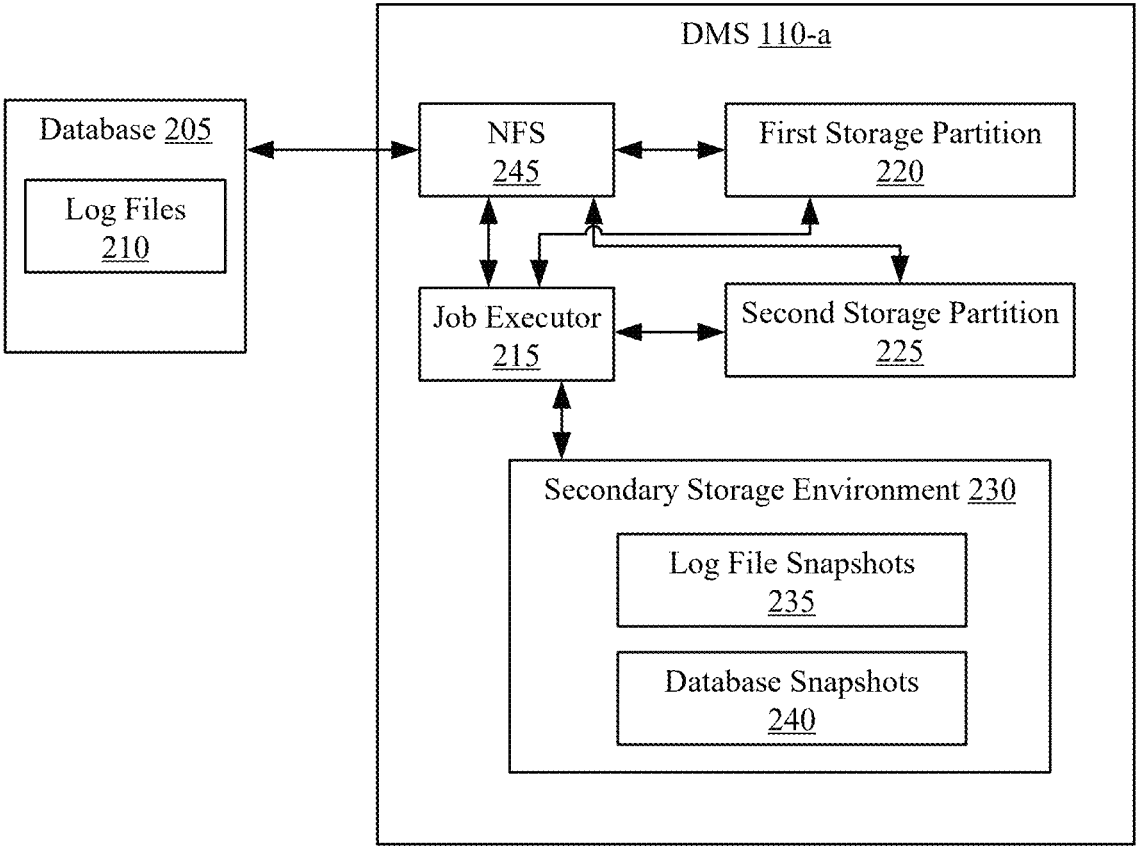
FIG. 2 shows an example of a computing environment that supports backup management of database log files in accordance with aspects of the present disclosure.

FIG. 2 shows an example of a computing environment 200 that supports backup management of database log files in accordance with aspects of the present disclosure. The computing environment 200 may implement or may be implemented by aspects of the computing environment 100. For example, the computing environment 200 includes a DMS 110-*a*, which may be an example of a DMS 110 as described herein. The DMS 110-*a* may provide backup and recovery services for a database 205. For example, the database 205 may be an example of a computing system 105 as described herein.

The database 205 may generate log files 210 which record change events at the database. For example, such change events may be the addition, deletion, or modification of one or more files or entries stored at the database 205. In some examples, the log files 210 may record the details of the modifications of the files or entries (e.g., how the files or entries are modified).

The DMS 110-*a* may periodically capture data backup snapshots 240 of the database 205 (e.g., snapshots 135 as described herein), for example, in accordance with an SLA for a customer associated with the database 205. The DMS 110-*a* may store the data backup snapshots 240 in a secondary storage environment 230. As the log files 210 record change events at the database 205, the log files 210 in combination the data backup snapshots 240 may be used to restore the database 205 to a point in time between corresponding data backup snapshots 240. For example, if data backup snapshots 240 are captured by the DMS 110-*a* every hour, the log files may be used to restore the database 205 to a state at a more granular level than every hour. Accordingly, backup of log file 210 may be used to achieve a lower RPO for the database 205.

The DMS 110-*a* may use an NFS 245 to interface with the database 205 to ingest log files 210. In some examples, the log files 210 may be ingested as the log files 210 are created by the database 205 (e.g., in a push manner). In the backup domain, ingested data onto a backup share (e.g., a storage partition at the DMS 110-*a*) may be snapshotted periodically in order to move the ingested log file data into a secondary storage environment 230 for long term storage. While the backup share is being snapshotted, the backup share may be unavailable to receive new log files 210. In the case of MV, such a duration could be between a few minutes and a several hours.

To enable at least one backup share that is always able to receive log files 210, the DMS 110-*a* may include two storage partitions for the log files 210 of the database 205: a first storage partition 220 and a second storage partition 225. The DMS 110-*a* may alternate the first storage partition 220 and the second storage partition 225 between active and passive states. The DMS 110-*a* may store log files 210 received from the database 205 via the NFS 245 in the storage partition which is currently in the active state (e.g., whichever of the first storage partition 220 and the second storage partition 225 is currently in the active state). The DMS 110-*a* may capture a snapshot of the storage partition in the passive state in order to back up the log files stored at the storage partition. The snapshot of the storage partition may be stored in the secondary storage environment 230. For example, the secondary storage environment 230 may be a local storage at the DMS 110-*a* (e.g., such as the storage nodes 185 as described herein) or a remote storage environment (e.g., such as the node clusters 196 at a cloud environment 195 as described herein). In some examples, the log file snapshots 235 (e.g., the snapshots of the storage partitions) and the data backup snapshots 240 may be stored in the same secondary storage environment 230. In some examples, the log file snapshots 235 (e.g., the snapshots of the storage partitions) and the data backup snapshots 240 may be stored in different secondary storage environments. As the DMS 110-*a* captures the snapshot of the storage partition in the passive state, the other storage partition may be maintained in the active state in order to receive log files 210 as the log files 210 are generated by the database 205. Thus, at any point in time, one storage partition (one of the first storage partition 220 or the second storage partition 225) is in the active state and able to receive ingested log files while the other storage partition is in the passive state and able to be snapshotted and/or cleaned up.

The file system used by the first storage partition 220 and the second storage partition 225 may be Aligned File Aggregation Format (AF2) or fourth extended filesystem (ext4) with control over IO routing and space allocation. IO routing at the file system layer (e.g., the AF2 or ext4 layer) may be based on the storage partition state. File creation may be allowed on the storage partition in the active state. File edits may be allowed irrespective of whether a storage partition is in the active state or the passive state. File deletions may be allowed in a cleanup state (which may be a subset of the passive state).

In some examples, the DMS 110-*a* may perform periodic synchronization of the log files 210 in the storage partition in the active state, for example, based on RPO requirements for the database 205. For example, the DMS 110-*a* may periodically synchronize the log files (e.g., in the AF2 file format or ext4 file format in the active storage partition as well as the accompanying metadata shards) in the storage partition in the active state to the secondary storage environment 230. In the case of a restore operation, the DMS 110-*a* may restore the database 205 to a last synchronization point (e.g., in the case of any failures to meet an RPO requirement). As the backup share may be reset to the last successful sync point when a system failure occurs at the database, RPO requirements of 5 minutes or less may be achieved by configuring the sync frequency to 4 minutes.

In some examples, the DMS 110-*a* may include a job executor 215 which may capture the snapshots of the storage partitions in the passive state (e.g., the first storage partition

220 and the second storage partition 225) and/or which may store the log files in the storage partitions.

The DMS 110-*a* may perform periodic snapshotting and cleanup of the storage partition in the passive state. For example, the DMS 110-*a* may transition a storage partition from the passive state to a cleanup state (e.g., every x hours or per a snapshot schedule). In some examples, the DMS 110-*a* may capture a snapshot of the storage partition in the cleanup state without a corresponding chain at a blobstore of the DMS 110-*a*. In some examples, the DMS 110-*a* may clean up the storage partition by recreating underlying shards in the relevant file format for the storage partition (e.g., AF2 shares for an AF2 file format or ext4 shards for an ext4 format storage partition). The storage partition may be transitioned from the cleanup state to the active state and from the active state to the passive state. Capturing a snapshot of a storage partition in the passive state may be referred to as "hot snapshotting" as the snapshot may be captured while IOs are allowed on the storage partition.

The use of the first storage partition 220 and the second storage partition 225 which alternative between the passive and active states may be different from the backup and recovery procedures used for data backups of the database 205. For user experience for recovery purposes, a user of the DMS 110-*a* (e.g., a customer of the DMS 110-*a* associated with the database or an administrator of the DMS 110-*a*) may provide (e.g., via a computing device 115) a time range for which log files 210 are requested, for example a desired recovery time range. The DMS 110-*a* may identify a list of the log file snapshots 235 within the indicated time range (e.g., on a user interface of the computing device 115). For every identified snapshot, the DMS 110-*a* may create a directory specific to that snapshot in a parent directory. The DMS 110-*a* may perform export over the related patch files of the snapshot onto the created directory (e.g., using the relevant file format such as AF2 or ext4), and the DMS 110-*a* may export the parent directory as an NFS share. The DMS 110-*a* may mount the NFS share on a directory, as specified by the customer (e.g., via the computing device 115) on the remote host.

The use of alternating storage partitions may enable an always available read/write backup share at the DMS 110-*a* backed by two storage partitions (the first storage partition 220 and the second storage partition 225) and a method for non-disruptive hot snapshotting of ingested logs via the transition between the states for the storage partitions. Further, the DMS 110-*a* may provide a rolling window view of the log files 210. For example, intelligent IO routing may be used for segregation of log files into storage partitions based on the ingestion pattern of the log files (e.g., when the log files are ingested). Further, partitions may be efficiently cleaned up by recreating the underlying file shards of the partitions (e.g., AF2 shards or ext4 shards). As another example, intelligent IO routing and transition of states, along with periodic efficient cleanup among storage partitions may enable a 'rolling window' view of log files on the backup share of the DMS 110-*a*. Periodic snapshotting and efficient cleanup of the passive storage partition with zero length chaining (e.g., as snapshots of the storage partitions (e.g., the log file snapshots 235) may be full snapshots of the storage partitions and not incremental snapshots, chaining of snapshots may not be implemented), thereby simplifying background operations at a blobstore of the DMS 110-*a* (e.g., due to not having to identify snapshot chains for the log files 210). Additionally, "light weight" snapshots of the storage partitions may be created while a storage partition is in the active state via sync functionality at the file system layer (e.g., the AF2 layer or ext4 layer), which can be used to reduce RPO. For example, sync points may be used as restore points to achieve low RPO.

Figure 3:
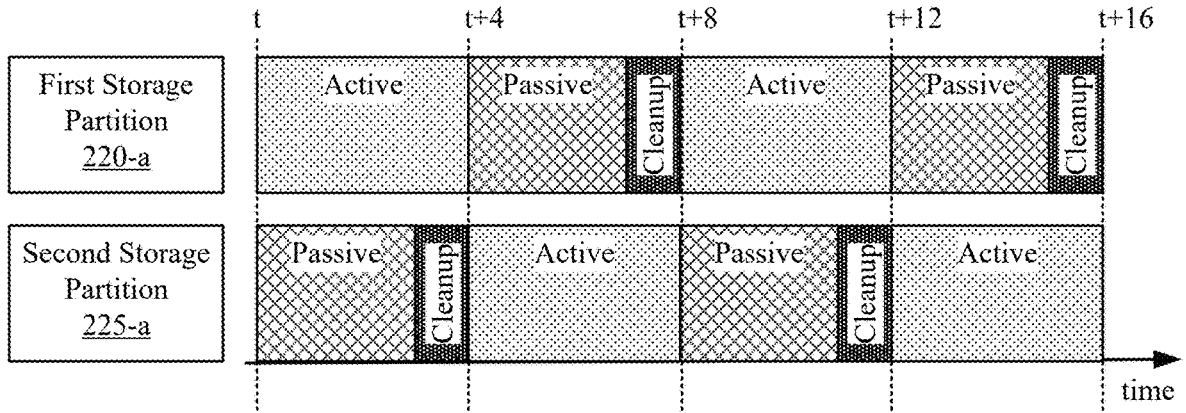
FIG. 3 shows an example of an active/passive partition scheme timeline that supports backup management of database log files in accordance with aspects of the present disclosure.
Figure 3:
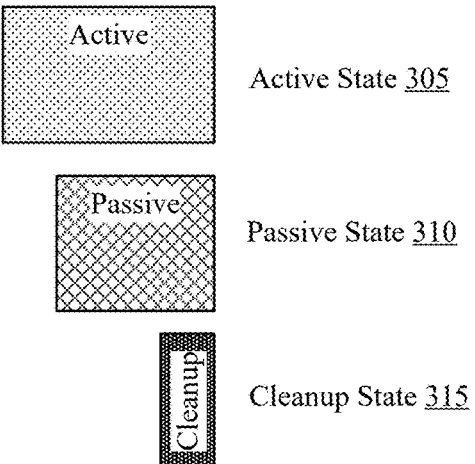

FIG. 3 shows an example of an active/passive partition scheme timeline 300 that supports backup management of database log files in accordance with aspects of the present disclosure. The active/passive partition scheme timeline 300 may implement or may be implemented by one or more aspects of the computing environment 100 or the computing environment 200. For example, the active/passive partition scheme timeline 300 includes a first storage partition 220-*a*, which may be an example of a first storage partition 220 as described herein. The active/passive partition scheme timeline 300 includes a second storage partition 225-*a*, which may be an example of a second storage partition 225 as described herein.

As described herein, a DMS 110 may transition the first storage partition 220-*a* and the second storage partition 225-*a* between an active state 305, a passive state 310, and a cleanup state 315. In some examples, the cleanup state 315 may be considered a substate of the passive state 310. As shown in the active/passive partition scheme timeline 300, one of the first storage partition 220-*a* or the second storage partition 225-*a* is always in the active state 305 in order to receive ingested log files 210.

For example, as shown in FIG. 3, during a first time period between time t and t+4, the first storage partition 220-*a* may be in the active state 305 and may receive log files. During the first time period the second storage partition 225-*a* may be in the passive state 310 and the DMS 110 may capture a snapshot of the second storage partition 225-*a*. After capturing the snapshot of the second storage partition 225-*a*, the DMS 110-*a* may transition the second storage partition 225-*a* to the cleanup state 315 in order to prepare the second storage partition 225-*a* to transition back to the active state 305. For example, in the cleanup state 315, the DMS 110 may recreate underlying shards of the relevant file format (e.g., AF2 shards or ext4 shards) for the storage partition in the cleanup state 315 so that the shards can be written with newly received log files.

At time t+4, the second storage partition 225-*a* may be transitioned from the cleanup state 315 to the active state 305 and the first storage partition 220-*a* may be transitioned from the active state 305 to the passive state 310. Thus, during a second time period from time t+4 to time t+8, the second storage partition 225-*a* may be in the active state 305 and may receive log files. During the second time period the first storage partition 220-*a* may be in the passive state 310 and the DMS 110 may capture a snapshot of the first storage partition 220-*a*. After capturing the snapshot of the first storage partition 220-*a*, the DMS 110 may transition the first storage partition 220-*a* to the cleanup state 315 in order to prepare the first storage partition 220-*a* to transition back to the active state 305.

At time t+8, the first storage partition 220-*a* may be transitioned from the cleanup state 315 to the active state 305 and the second storage partition 225-*a* may be transitioned from the active state 305 to the passive state 310. Thus, during a third time period between time t+8 and t+12, the first storage partition 220-*a* may be in the active state 305 and may receive log files. During the third time period the second storage partition 225-*a* may be in the passive state 310 and the DMS 110 may capture a snapshot of the second storage partition 225-*a*. After capturing the snapshot of the second storage partition 225-*a*, the DMS 110-*a* may transition the second storage partition 225-*a* to the cleanup state 315 in order to prepare the second storage partition 225-*a* to transition back to the active state 305.

At time t+12, the second storage partition 225-*a* may be transitioned from the cleanup state 315 to the active state 305 and the first storage partition 220-*a* may be transitioned from the active state 305 to the passive state 310. Thus, during a fourth time period from time t+12 to time t+16, the second storage partition 225-*a* may be in the active state 305 and may receive log files. During the fourth time period the first storage partition 220-*a* may be in the passive state 310 and the DMS 110 may capture a snapshot of the first storage partition 220-*a*. After capturing the snapshot of the first storage partition 220-*a*, the DMS 110-*a* may transition the first storage partition 220-*a* to the cleanup state 315 in order to prepare the first storage partition 220-*a* to transition back to the active state 305.

Thus, as shown in FIG. 3, the DMS 110 may transition the first storage partition 220-*a* and the second storage partition 225-*a* between an active state 305, a passive state 310, and a cleanup state 315. As a log file may demand sufficient time (e.g., in the range of a few minutes) to be ingested by the DMS 110, the alternating storage partition design allows the log file to be edited for all the time while the log file is in the 'active' or 'passive' partition which may be up to a few hours before the file is cleaned up in the cleanup state 315. For example, a log file that is created (e.g., stored) in the storage partition just before the partition transitions from the active state 305 to the passive state 310 will be editable while the log file is in the storage partition in the passive state 310. As a log file is not needed by the DMS 110-*a* once the ingestion of the log file is complete (e.g., as the log file is stored in the secondary storage environment 230 after the storage partition is snapshotted), the log file may be removed from the storage partition automatically in the cleanup state 315 to make space for new log file ingestion into the storage partition. The log file backup design implemented by the DMS 110 may perform cleanup by recreating a partition without chaining among snapshots of the storage partitions (e.g., as snapshots of the storage partitions (e.g., the log file snapshots 235) may be full snapshots of the storage partitions and not incremental snapshots), this providing backup efficiency.

As described herein, in some examples, a storage partition in the active state 305 may periodically perform a sync operation to store the log files which have been ingested while the storage partition is in the active state 305 in the secondary storage environment 230. For example, to achieve an RPO of 5 minutes, a storage partition may perform a sync operation every 4 minutes. To perform a sync operation every 4 minutes, the log files that have been ingested since the last sync operation (or since the transition to the active state for a first sync operation) may be sent to the secondary storage environment. Capturing the snapshot of the storage partition in the passive state may involve storing the remainder of the log files that were ingested after the last sync operation, updating log files based on read/write operations that occurred since the last synchronization, deduplicating log files, and creation of a patch file image at a blobstore of the DMS 110 representative of the snapshot.

Figure 4:
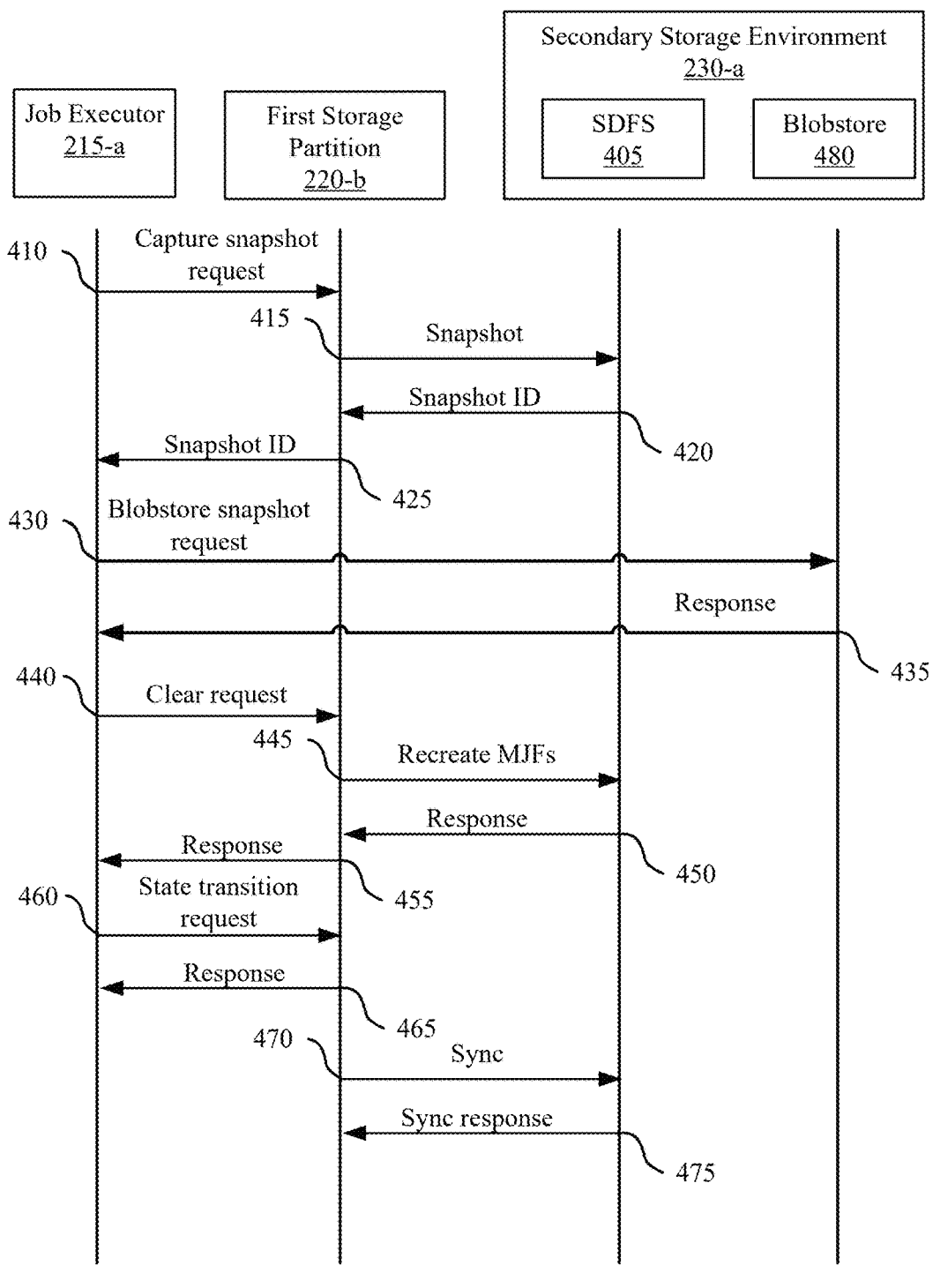
FIG. 4 shows an example of a process flow that supports backup management of database log files in accordance with aspects of the present disclosure.

FIG. 4 shows an example of a process flow 400 that supports backup management of database log files in accordance with aspects of the present disclosure. The process flow 400 may implement or may be implemented by one or more aspects of the computing environment 100, the computing environment 200, or the active/passive partition scheme timeline 300. For example, the process flow 400 may include a job executor 215-*a*, which may be an example of a job executor 215 as described herein (e.g., a job fetch looper of a DMS 110). The process flow 400 may include a first storage partition 220-*b*, which may be an example of a first storage partition 220 as described herein. The process flow 400 may include a secondary storage environment 230-*a*, which may be an example of a secondary storage environment 230 as described herein. The secondary storage environment 230-*a* may include a software defined file system (SDFS) 405 and a blobstore 480. In the following description of the process flow 500, operations between the job executor 215-*a*, the first storage partition 220-*b*, the SDFS 405, and the blobstore 480 may be added, omitted, or performed in a different order (with respect to the exemplary order shown).

At 410, the first storage partition 220-*b* may be in the passive state, and the job executor 215-*a* may send a request to the first storage partition 220-*b* to capture a snapshot of the first storage partition 220-*b*. At 415 the snapshot of the first storage partition may be captured and sent to the SDFS 405. For example, the snapshot at 415 may be merged journal file (MJF) snapshot of the first storage partition 220-*b*. For example, the first storage partition 220-*b* may be a AF2 partition backed by a set of MJFs, and the snapshot may capture the MJFs. For example, files in the first storage partition 220-*b* may be stored in the form of MJFs, and thus a snapshot of the first storage partition 220-*b* may capture the MJFs of the first storage partition 220-*b*.

At 420, the SDFS may send an indication of the snapshot ID stored in the SDFS to the first storage partition 220-*b*. At 425, the first storage partition 220-*b* may send an indication of the snapshot ID to the job executor 215-*a*.

At 430, the job executor may send a blobstore request to the blobstore 480 which indicates the snapshot ID to create a patch file name at the blobstore 480 that corresponds to the snapshot. The blobstore 480 may perform PFC by calling a "create patch file for snapshot" function with the snapshot ID received from the job executor 215-*a* at 430, the patch file name, and metadata details for chaining the snapshot (e.g., an indication of the logical locations data blocks at the SDFS that store the snapshot). At 435, the blobstore 480 may send a response to the job executor 215-*a* indicating the creation of the patch file image corresponding to the snapshot.

At 440, the job executor may send a clear request to the first storage partition 220-*b*, which may transition the first storage partition 220-*b* from the passive state to the cleanup state. At 445, the first storage partition 220-*b* may perform cleanup, which may involve recreating MJFs for the first storage partition 220-*b*. For example, the first storage partition 220-*b* may send a request to the SDFS 405 to recreate the MJFs (e.g., AF2 shards or ext4 shards), and at 450 the SDFS 405 may send a response with recreated MJFs for the first storage partition 220-*b*. In some examples, at 455, the first storage partition 220-*b* may send a response to the job executor 215-*a* indicating completion of cleanup of the first storage partition 220-*b*.

At 460, based on the indication of completion of cleanup of the first storage partition 220-*b*, the job executor 215-*a* may send a state transition request to the first storage partition 220-*b* indicating for the first storage partition 220-*b* to transition to the active state. At 465, the first storage partition 220-*b* may transition to the active state and may send a response to the job executor 215-*a* indicating that the first storage partition 220-*b* transitioned to the active state.

In the active state, the first storage partition 220-*b* may receive log files, which may be stored in MJFs at the first storage partition 220-*b*. The first storage partition 220-*b* may periodically sync the received or ingested log files to the SDFS 405 while the first storage partition 220-*b* is in the active state. For example, at 470, the first storage partition 220-*b* may sync the log files that were received at the first storage partition 220-*b* between 465 and 470. At 475, the SDFS may send a sync response confirming the sync operation (e.g., confirming storage of the log files at the SDFS 405). The first storage partition 220-*b* may periodically perform sync operations while in the active state (e.g., every 4 minutes to achieve an RPO of 5 minutes for the backed up database).

Figure 5:
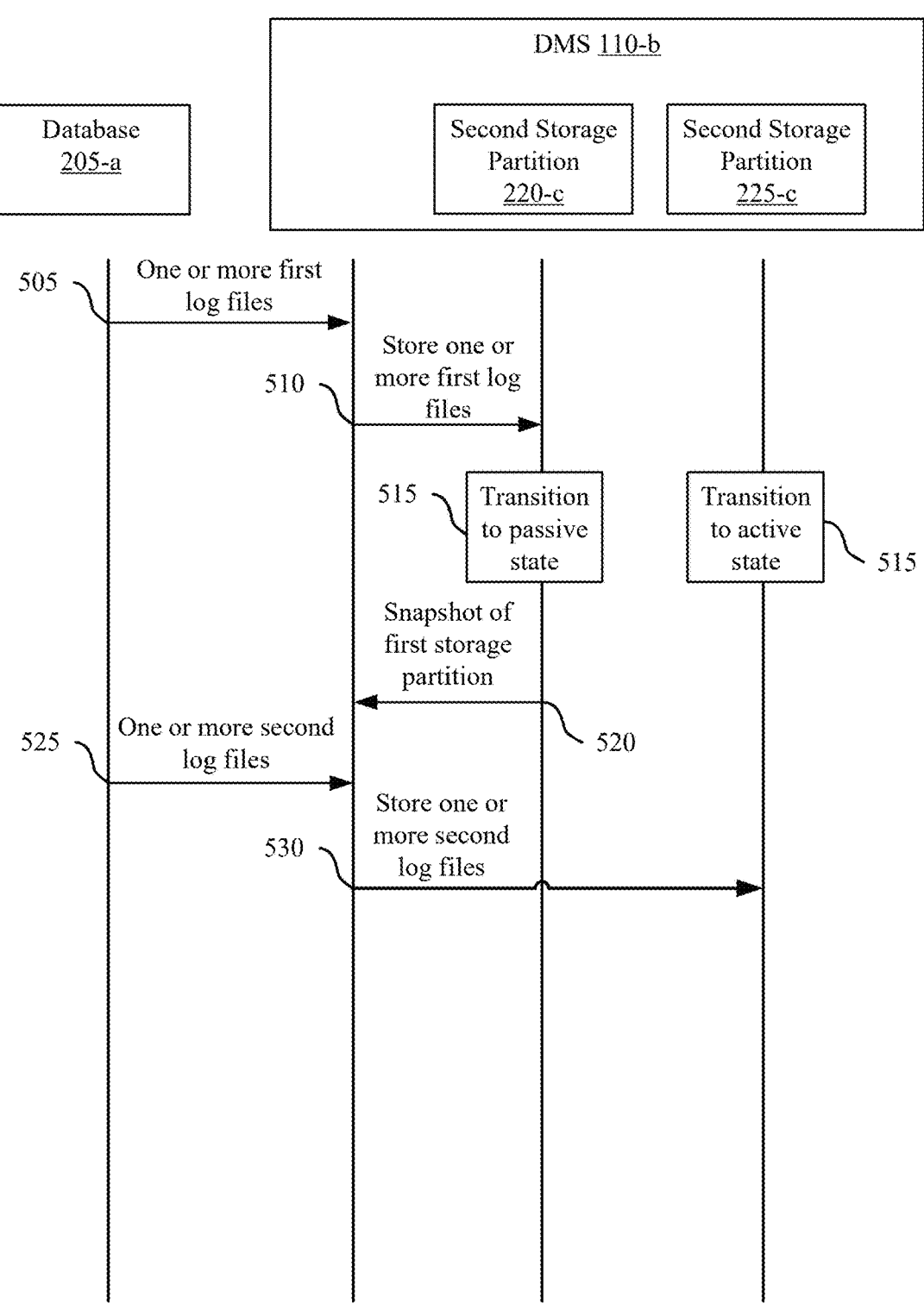
FIG. 5 shows an example of a process flow that supports backup management of database log files in accordance with aspects of the present disclosure.

FIG. 5 shows an example of a process flow 500 that supports backup management of database log files in accordance with aspects of the present disclosure. The process flow 500 may implement or may be implemented by one or more aspects of the computing environment 100, the computing environment 200, or the active/passive partition scheme timeline 300. For example, the process flow 500 may include a database 205-*a*, which may be an example of a database 205 as described herein. The process flow 500 may include a DMS 110-*b*, which may be an example of a DMS 110 as described herein. The process flow 500 may include a first storage partition 220-*c*, which may be an example of a first storage partition 220 as described herein. The process flow 500 may include a second storage partition 225-*c*, which may be an example of a second storage partition 225 as described herein. In the following description of the process flow 500, operations between the database 205, the DMS 110-*b*, the first storage partition 220-*c*, and the second storage partition 225-*c* may be added, omitted, or performed in a different order (with respect to the exemplary order shown).

At 505, the DMS 110-*b* may obtain, during a first time period, one or more first log files from the database 205-*a*. The one or more first log files may be indicative of one or more first respective events associated with the database 205-*a*. For example, the one or more first respective events may include one or more additions of files to the database 205-*a*, one or more deletions of files from the database 205-*a*, or one or more modifications of files at the database 205-*a*. For example, the DMS 110-*b* may receive the one or more first log files via an NFS as described herein.

At 510, the DMS 110-*b* may store, during the first time period, the one or more first log files in the first storage partition 220-*c* of the DMS 110-*b* based on the first storage partition 220-*c* being in an active state during the first time period. During the first time period, the second storage partition 225-*c* may be in a passive state.

At 515, at an end of the first time period, the DMS 110-*b* may transition the first storage partition 220-*c* from the active state to the passive state, and the DMS 110-*b* may transition the second storage partition 225-*c* from the passive state to the active state.

At 520, the DMS 110-*b* may capture, during a second time period subsequent to the end of the first time period, a snapshot of the first storage partition 220-*c* while the first storage partition 220-*c* is in the passive state.

At 525, the DMS 110-*b* may obtain, during the second time period, one or more second log files from the database 205-*a*. The one or more second log files may be indicative of one or more second respective events associated with the database 205-*a*. For example, the one or more second respective events may include one or more additions of files to the database 205-*a*, one or more deletions of files from the database 205-*a*, or one or more modifications of files at the database 205-*a*.

At 530, the DMS 110-*b* may store, during the second time period, the one or more second log files in the second storage partition 225-*c* of the DMS 110-*b* based on the second storage partition 225-*c* being in the active state during the second time period.

In some examples, the DMS 110-*b* may delete, during the second time period and subsequent to capturing the snapshot, the one or more first log files from the first storage partition 220-*c* (e.g., while the first storage partition 220-*c* is in a cleanup state). For example, the DMS 110-*b* may perform cleanup of the first storage partition 220-*c* after capturing the snapshot of the first storage partition 220-*c*. In some examples, the DMS 110-*b* may transition, at an end of the second time period, the second storage partition 225-*c* from the active state to the passive state and the first storage partition 220-*c* from the passive state to the active state. In such examples, the DMS 110-*b* may capture, during a third time period subsequent to the end of the second time period while the second storage partition 225-*c* is in the passive state, a second snapshot of the second storage partition 225-*c*. In such examples, the DMS 110-*b* may obtain, during the during the third time period, one or more third log files from the database 205-*a*, where the one or more third log files are indicative of one or more third respective events associated with the database 205-*a*. In such examples, the DMS 110-*b* may store, during the third time period, the one or more third log files in the first storage partition 220-*c* based on the first storage partition 220-*c* being in the active state during the third time period. For example, the DMS 110-*b* may alternate (e.g., periodically) the first storage partition 220-*c* and the second storage partition 225-*c* between the active and passive states in order to receive log files from the database 205-*a* in a push manner. In some examples, the DMS 110-*b* may transition the storage partitions (e.g., the first storage partition 220-*c* and the second storage partition 225-*c*) between the active and passive states based on the storage partition in the active state reaching a threshold memory capacity (e.g., the ingested log files reaching a memory threshold).

In some examples, the DMS 110-*b* may delete, during the first time period and prior to transitioning the second storage partition 225-*c* from the passive state to the active state, one or more prior log files from the second storage partition 225-*c*. For example, the DMS 110-*b* may perform cleanup of the second storage partition 225-*c* prior to transitioning the second storage partition 225-*c* to the active state. In some examples, the DMS 110-*b* may transition the storage partitions (e.g., the first storage partition 220-*c* and the second storage partition 225-*c*) between the active and passive states based on clean up of the storage partition in the passive state being complete.

In some examples, transitioning the first storage partition from the active state to the passive state and the second storage partition from the passive state to the active state at 515 may be based on a duration of the first time period satisfying a threshold. For example, the DMS 110-*b* may periodically transition the first storage partition 220-*c* and the second storage partition 225-*c* between the active and passive states.

In some examples, the DMS 110-*b* may store the snapshot captured at 520 in a secondary storage environment (e.g., a secondary storage environment 230 as described herein) accessible to the DMS 110-*b*. In some examples, the DMS 110-*b* may obtain, at a first time prior to the first time period, a first snapshot of the database 205-*a*. The DMS 110-*b* may obtain, at a second time subsequent to the first time period, a second snapshot of the database 205-*a*. The DMS 110-*b* may store the first snapshot and the second snapshot in the secondary storage environment. The DMS 110-*b* may perform a restore operation for the database 205-*a* to a state corresponding to a third time between the first time and the second time based on at least one of the first snapshot of the database 205-*a* or the second snapshot of the database 205-*a* stored in the secondary storage environment and based on the one or more first log files stored in the secondary storage environment. For example, the log files of the database 205-*a* may be used in combination with a snapshot of the database 205-*a* to restore to a state of the database 205-*a* corresponding to a time between snapshots of the database 205-*a*.

In some examples, the DMS 110-*b* may store, at a first time during the first time period, a first subset of the one or more first log files that have been obtained by the DMS 110-*b* by the first time in a secondary storage environment (e.g., a secondary storage environment 230 as described herein) accessible to the DMS 110-*b*. In some examples, storing the first subset of the one or more first log files is based on a first duration since a beginning of the first time period satisfying a threshold. For example, the DMS 110-*b* may periodically perform a sync operation on the currently active storage partition. In some examples, the DMS 110-*b* may store, at a second time during the first time period, a second subset of the one or more first log files that have been obtained by the DMS 110-*b* by the second time and since the first time in the secondary storage environment. In some examples, storing the second subset of the one or more first log files may be based on a second duration since the first time satisfying the threshold. In some examples, capturing the snapshot at 520 involves storing, by the DMS 110-*b*, a remainder of the one or more first log files in the secondary storage environment that have not already been stored in the secondary storage environment. In some examples, capturing the snapshot at 520 involves performing deduplication of the one or more first log files stored in the secondary storage environment.

In some examples, the one or more first log files and the one or more second log files are obtained at 505 and at 525 in a push manner from the database 205-*a*.

Figure 6:
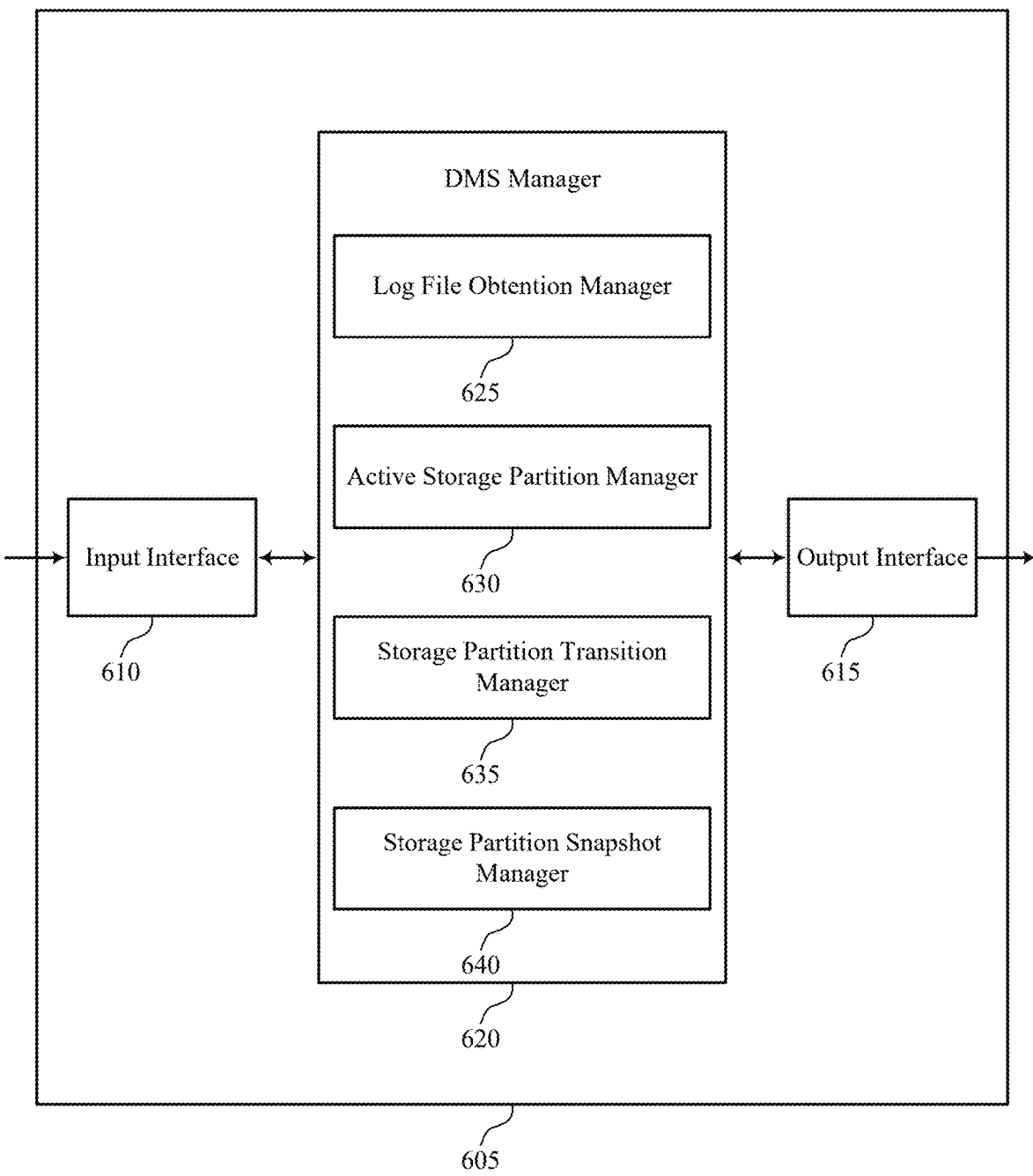
FIG. 6 shows a block diagram of an apparatus that supports backup management of database log files in accordance with aspects of the present disclosure.

FIG. 6 shows a block diagram 600 of a system 605 that supports backup management of database log files in accordance with aspects of the present disclosure. In some examples, the system 605 may be an example of aspects of one or more components described with reference to FIG. 1, such as a DMS 110. The system 605 may include an input interface 610, an output interface 615, and a DMS manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the DMS manager 620 to support backup management of database log files. In some cases, the input interface 610 may be a component of a network interface 825 as described with reference to FIG. 8.

The output interface 615 may manage output signaling for the system 605. For example, the output interface 615 may receive signaling from other components of the system 605, such as the DMS manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the DMS manager 620 may include a log file obtention manager 625, an active storage partition manager 630, a storage partition transition manager 635, a storage partition snapshot manager 640, or any combination thereof. In some examples, the DMS manager 620, or various components thereof, may be configured to perform various operations (e.g., receiving, monitoring, transmitting) using or otherwise in cooperation with the input interface 610, the output interface 615, or both. For example, the DMS manager 620 may receive information from the input interface 610, send information to the output interface 615, or be integrated in combination with the input interface 610, the output interface 615, or both to receive information, transmit information, or perform various other operations as described herein.

The log file obtention manager 625 may be configured as or otherwise support a means for obtaining, by a DMS and during a first time period, one or more first log files from a database, where the one or more first log files are indicative of one or more first respective events associated with the database. The active storage partition manager 630 may be configured as or otherwise support a means for storing, by the DMS and during the first time period, the one or more first log files in a first storage partition of the DMS based on the first storage partition being in an active state during the first time period, and where a second storage partition of the DMS is in a passive state during the first time period. The storage partition transition manager 635 may be configured as or otherwise support a means for transitioning, at an end of the first time period and by the DMS, the first storage partition from the active state to the passive state and the second storage partition from the passive state to the active state. The storage partition snapshot manager 640 may be configured as or otherwise support a means for capturing, by the DMS and during a second time period subsequent to the end of the first time period while the first storage partition is in the passive state, a snapshot of the first storage partition. The log file obtention manager 625 may be configured as or otherwise support a means for obtaining, by the DMS and during the second time period, one or more second log files from the database, where the one or more second log files are indicative of one or more second respective events associated with the database. The active storage partition manager 630 may be configured as or otherwise support a means for storing, by the DMS and during the second time period, the one or more second log files in the second storage partition based on the second storage partition being in the active state during the second time period.

Figure 7:
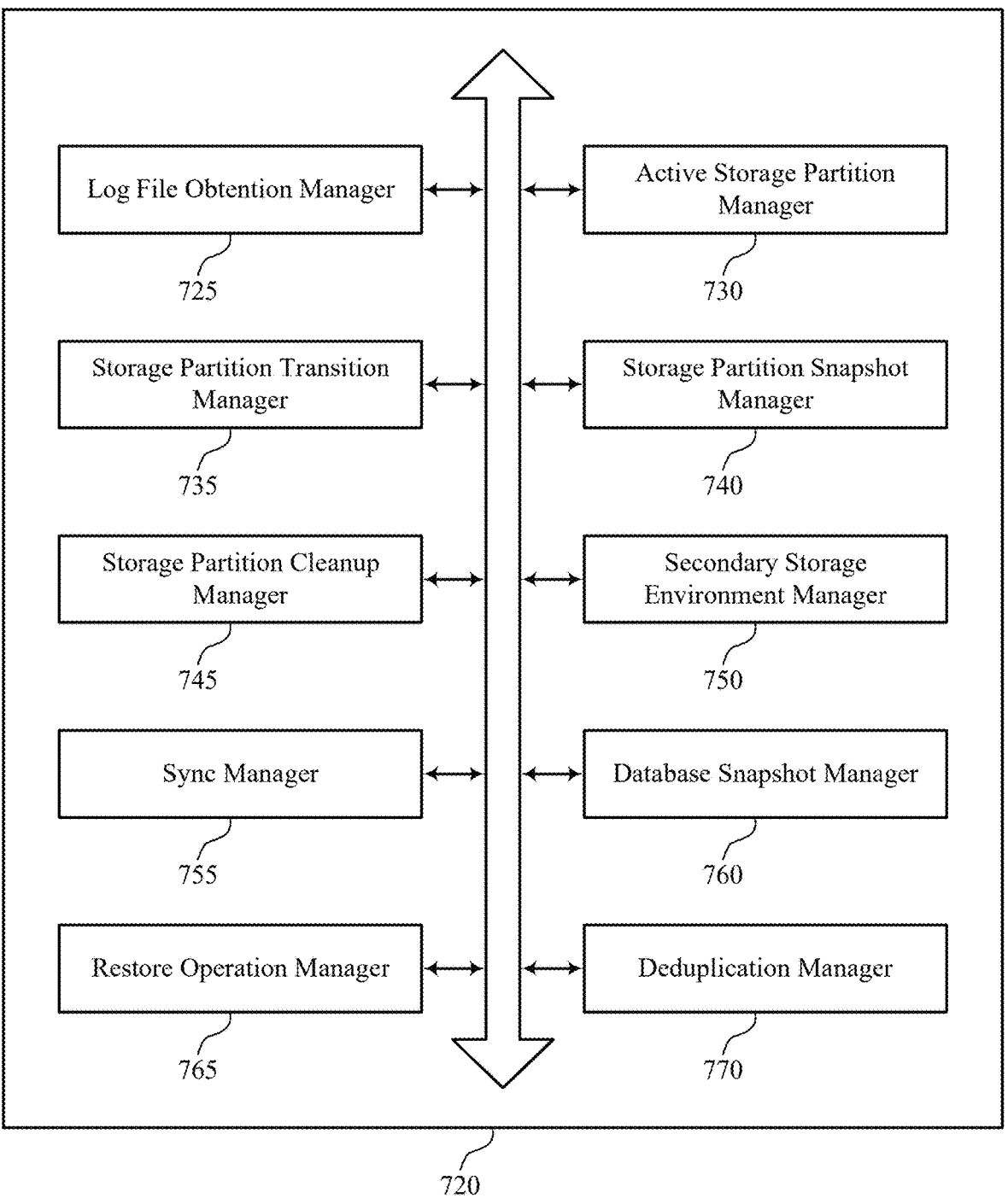
FIG. 7 shows a block diagram of a data management system manager that supports backup management of database log files in accordance with aspects of the present disclosure.

FIG. 7 shows a block diagram 700 of a DMS manager 720 that supports backup management of database log files in accordance with aspects of the present disclosure. The DMS manager 720 may be an example of aspects of a DMS manager or a DMS manager 620, or both, as described herein. The DMS manager 720, or various components thereof, may be an example of means for performing various aspects of backup management of database log files as described herein. For example, the DMS manager 720 may include a log file obtention manager 725, an active storage partition manager 730, a storage partition transition manager 735, a storage partition snapshot manager 740, a storage partition cleanup manager 745, a secondary storage environment manager 750, a sync manager 755, a database snapshot manager 760, a restore operation manager 765, a deduplication manager 770, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The log file obtention manager 725 may be configured as or otherwise support a means for obtaining, by a DMS and during a first time period, one or more first log files from a database, where the one or more first log files are indicative of one or more first respective events associated with the database. The active storage partition manager 730 may be configured as or otherwise support a means for storing, by the DMS and during the first time period, the one or more first log files in a first storage partition of the DMS based on the first storage partition being in an active state during the first time period, and where a second storage partition of the DMS is in a passive state during the first time period. The storage partition transition manager 735 may be configured as or otherwise support a means for transitioning, at an end of the first time period and by the DMS, the first storage partition from the active state to the passive state and the second storage partition from the passive state to the active state. The storage partition snapshot manager 740 may be configured as or otherwise support a means for capturing, by the DMS and during a second time period subsequent to the end of the first time period while the first storage partition is in the passive state, a snapshot of the first storage partition. In some examples, the log file obtention manager 725 may be configured as or otherwise support a means for obtaining, by the DMS and during the second time period, one or more second log files from the database, where the one or more second log files are indicative of one or more second respective events associated with the database. In some examples, the active storage partition manager 730 may be configured as or otherwise support a means for storing, by the DMS and during the second time period, the one or more second log files in the second storage partition based on the second storage partition being in the active state during the second time period.

In some examples, the storage partition cleanup manager 745 may be configured as or otherwise support a means for deleting, by the DMS during the second time period and subsequent to capturing the snapshot, the one or more first log files from the first storage partition.

In some examples, the storage partition transition manager 735 may be configured as or otherwise support a means for transitioning, at an end of the second time period and by the DMS, the second storage partition from the active state to the passive state and the first storage partition from the passive state to the active state. In some examples, the storage partition snapshot manager 740 may be configured as or otherwise support a means for capturing, by the DMS and during a third time period subsequent to the end of the second time period while the second storage partition is in the passive state, a second snapshot of the second storage partition. In some examples, the log file obtention manager 725 may be configured as or otherwise support a means for obtaining, by the DMS and during the third time period, one or more third log files from the database, where the one or more third log files are indicative of one or more third respective events associated with the database. In some examples, the active storage partition manager 730 may be configured as or otherwise support a means for storing, by the DMS and during the third time period, the one or more third log files in the first storage partition based on the first storage partition being in the active state during the third time period.

In some examples, the storage partition cleanup manager 745 may be configured as or otherwise support a means for deleting, by the DMS during the first time period and prior to transitioning the second storage partition from the passive state to the active state, one or more prior log files from the second storage partition.

In some examples, transitioning the first storage partition from the active state to the passive state and the second storage partition from the passive state to the active state is based on a duration of the first time period satisfying a threshold.

In some examples, the one or more first respective events include one or more additions of files to the database, one or more deletions of files from the database, or one or more modifications of files at the database.

In some examples, the secondary storage environment manager 750 may be configured as or otherwise support a means for storing, by the DMS, the snapshot in a secondary storage environment accessible to the DMS.

In some examples, the database snapshot manager 760 may be configured as or otherwise support a means for obtaining, by the DMS and at a first time prior to the first time period, a first snapshot of the database. In some examples, the database snapshot manager 760 may be configured as or otherwise support a means for obtaining, by the DMS and at a second time subsequent to the first time period, a second snapshot of the database. In some examples, the secondary storage environment manager 750 may be configured as or otherwise support a means for storing, by the DMS, the first snapshot and the second snapshot in the secondary storage environment. In some examples, the restore operation manager 765 may be configured as or otherwise support a means for performing a restore operation for the database to a state corresponding to a third time between the first time and the second time based on at least one of the first snapshot of the database and the second snapshot of the database stored in the secondary storage environment and based on the one or more first log files stored in the secondary storage environment.

In some examples, the sync manager 755 may be configured as or otherwise support a means for storing, at a first time during the first time period and by the DMS, a first subset of the one or more first log files that have been obtained by the DMS by the first time in a secondary storage environment accessible to the DMS.

In some examples, storing the first subset of the one or more first log files is based on a first duration since a beginning of the first time period satisfying a threshold.

In some examples, the sync manager 755 may be configured as or otherwise support a means for storing, at a second time during the first time period and by the DMS, a second subset of the one or more first log files that have been obtained by the DMS by the second time and since the first time in the secondary storage environment.

In some examples, storing the second subset of the one or more first log files is based on a second duration since the first time satisfying the threshold.

In some examples, to support capturing the snapshot, the database snapshot manager 760 may be configured as or otherwise support a means for storing, by the DMS, a remainder of the one or more first log files in the secondary storage environment that have not already been stored in the secondary storage environment.

In some examples, to support capturing the snapshot, the deduplication manager 770 may be configured as or otherwise support a means for performing deduplication of the one or more first log files stored in the secondary storage environment.

In some examples, the one or more first log files and the one or more second log files are obtained in a push manner from the database.

Figure 8:
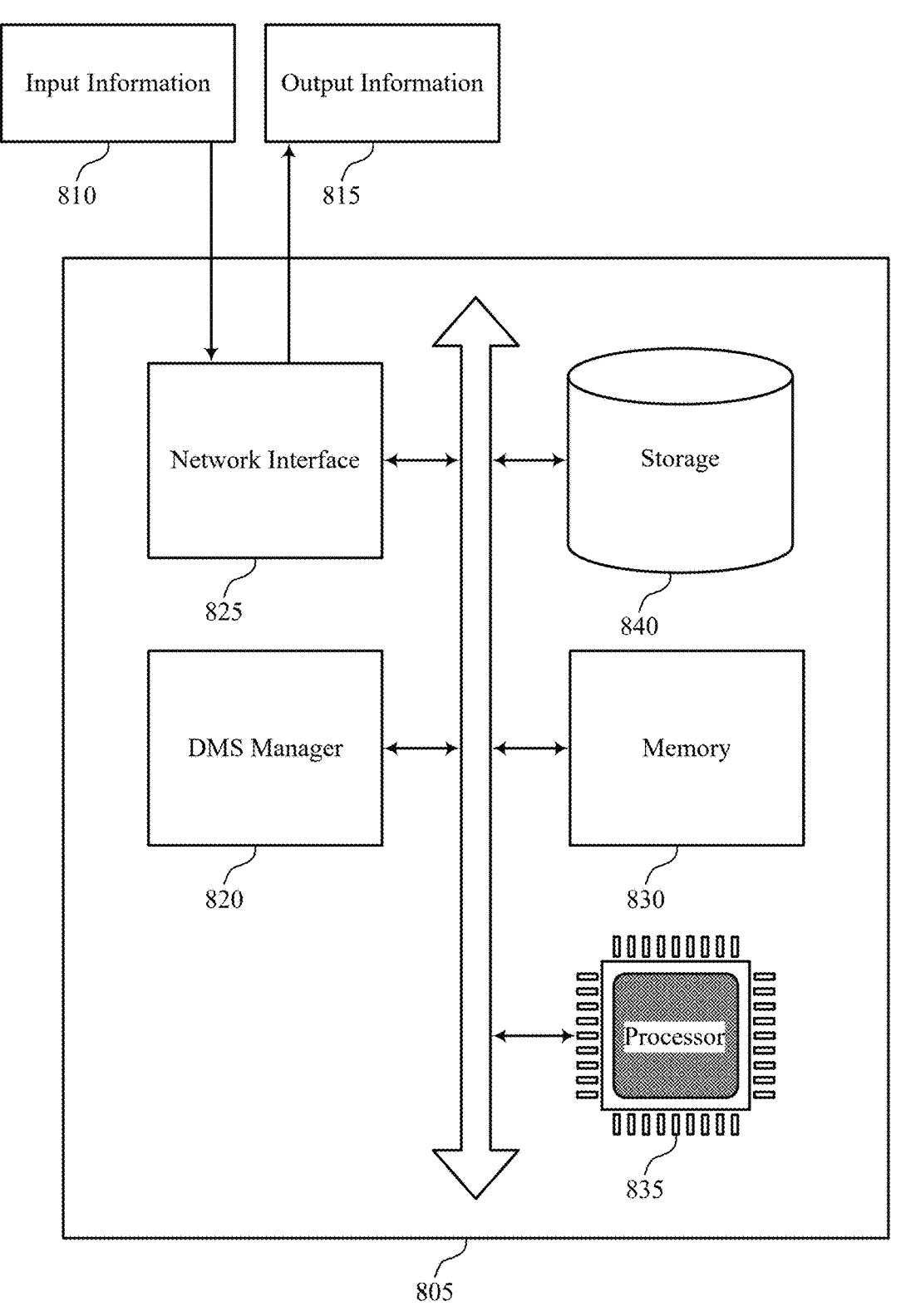
FIG. 8 shows a diagram of a system including a device that supports backup management of database log files in accordance with aspects of the present disclosure.

FIG. 8 shows a block diagram 800 of a system 805 that supports backup management of database log files in accordance with aspects of the present disclosure. The system 805 may be an example of or include components of a system 605 as described herein. The system 805 may include components for data management, including components such as a DMS manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting backup management of database log files). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the DMS manager 820 may be configured as or otherwise support a means for obtaining, by a DMS and during a first time period, one or more first log files from a database, where the one or more first log files are indicative of one or more first respective events associated with the database. The DMS manager 820 may be configured as or otherwise support a means for storing, by the DMS and during the first time period, the one or more first log files in a first storage partition of the DMS based on the first storage partition being in an active state during the first time period, and where a second storage partition of the DMS is in a passive state during the first time period. The DMS manager 820 may be configured as or otherwise support a means for transitioning, at an end of the first time period and by the DMS, the first storage partition from the active state to the passive state and the second storage partition from the passive state to the active state. The DMS manager 820 may be configured as or otherwise support a means for capturing, by the DMS and during a second time period subsequent to the end of the first time period while the first storage partition being in the passive state, a snapshot of the first storage partition. The DMS manager 820 may be configured as or otherwise support a means for obtaining, by the DMS and during the second time period, one or more second log files from the database, where the one or more second log files are indicative of one or more second respective events associated with the database. The DMS manager 820 may be configured as or otherwise support a means for storing, by the DMS and during the second time period, the one or more second log files in the second storage partition based on the second storage partition being in the active state during the second time period.

By including or configuring the DMS manager 820 in accordance with examples as described herein, the system 805 may support techniques for backup management of database log files, which may provide one or more benefits such as, for example, improved reliability, reduced latency, improved user experience, and more efficient utilization of computing resources, network resources or both, among other possibilities.

FIG. 9 shows a flowchart illustrating a method 900 that supports backup management of database log files in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include obtaining, by a DMS and during a first time period, one or more first log files from a database, where the one or more first log files are indicative of one or more first respective events associated with the database. The operations of 905 may be performed in accordance with examples as disclosed herein. In some examples, aspects of the operations of 905 may be performed by a log file obtention manager 725 as described with reference to FIG. 7.

At 910, the method may include storing, by the DMS and during the first time period, the one or more first log files in a first storage partition of the DMS based on the first storage partition being in an active state during the first time period, and where a second storage partition of the DMS is in a passive state during the first time period. The operations of 910 may be performed in accordance with examples as disclosed herein. In some examples, aspects of the operations of 910 may be performed by an active storage partition manager 730 as described with reference to FIG. 7.

At 915, the method may include transitioning, at an end of the first time period and by the DMS, the first storage partition from the active state to the passive state and the second storage partition from the passive state to the active state. The operations of 915 may be performed in accordance with examples as disclosed herein. In some examples, aspects of the operations of 915 may be performed by a storage partition transition manager 735 as described with reference to FIG. 7.

At 920, the method may include capturing, by the DMS and during a second time period subsequent to the end of the first time period while the first storage partition is in the passive state, a snapshot of the first storage partition. The operations of 920 may be performed in accordance with examples as disclosed herein. In some examples, aspects of the operations of 920 may be performed by a storage partition snapshot manager 740 as described with reference to FIG. 7.

At 925, the method may include obtaining, by the DMS and during the second time period, one or more second log files from the database, where the one or more second log files are indicative of one or more second respective events associated with the database. The operations of 925 may be performed in accordance with examples as disclosed herein. In some examples, aspects of the operations of 925 may be performed by a log file obtention manager 725 as described with reference to FIG. 7.

At 930, the method may include storing, by the DMS and during the second time period, the one or more second log files in the second storage partition based on the second storage partition being in the active state during the second time period. The operations of 930 may be performed in accordance with examples as disclosed herein. In some examples, aspects of the operations of 930 may be performed by an active storage partition manager 730 as described with reference to FIG. 7.

FIG. 10 shows a flowchart illustrating a method 1000 that supports backup management of database log files in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, by a DMS and during a first time period, one or more first log files from a database, where the one or more first log files are indicative of one or more first respective events associated with the database. The operations of 1005 may be performed in accordance with examples as disclosed herein. In some examples, aspects of the operations of 1005 may be performed by a log file obtention manager 725 as described with reference to FIG. 7.

At 1010, the method may include storing, by the DMS and during the first time period, the one or more first log files in a first storage partition of the DMS based on the first storage partition being in an active state during the first time period, and where a second storage partition of the DMS is in a passive state during the first time period. The operations of 1010 may be performed in accordance with examples as disclosed herein. In some examples, aspects of the operations of 1010 may be performed by an active storage partition manager 730 as described with reference to FIG. 7.

At 1015, the method may include transitioning, at an end of the first time period and by the DMS, the first storage partition from the active state to the passive state and the second storage partition from the passive state to the active state. The operations of 1015 may be performed in accordance with examples as disclosed herein. In some examples, aspects of the operations of 1015 may be performed by a storage partition transition manager 735 as described with reference to FIG. 7.

At 1020, the method may include capturing, by the DMS and during a second time period subsequent to the end of the first time period while the first storage partition is in the passive state, a snapshot of the first storage partition. The operations of 1020 may be performed in accordance with examples as disclosed herein. In some examples, aspects of the operations of 1020 may be performed by a storage partition snapshot manager 740 as described with reference to FIG. 7.

At 1025, the method may include obtaining, by the DMS and during the second time period, one or more second log files from the database, where the one or more second log files are indicative of one or more second respective events associated with the database.

The operations of 1025 may be performed in accordance with examples as disclosed herein. In some examples, aspects of the operations of 1025 may be performed by a log file obtention manager 725 as described with reference to FIG. 7.

At 1030, the method may include storing, by the DMS and during the second time period, the one or more second log files in the second storage partition based on the second storage partition being in the active state during the second time period. The operations of 1030 may be performed in accordance with examples as disclosed herein. In some examples, aspects of the operations of 1030 may be performed by an active storage partition manager 730 as described with reference to FIG. 7.

At 1035, the method may include deleting, by the DMS during the second time period and subsequent to capturing the snapshot, the one or more first log files from the first storage partition. The operations of 1035 may be performed in accordance with examples as disclosed herein. In some examples, aspects of the operations of 1035 may be performed by a storage partition cleanup manager 745 as described with reference to FIG. 7.

A method by an apparatus is described. The method may include obtaining, by a DMS and during a first time period, one or more first log files from a database, where the one or more first log files are indicative of one or more first respective events associated with the database, storing, by the DMS and during the first time period, the one or more first log files in a first storage partition of the DMS based on the first storage partition being in an active state during the first time period, and where a second storage partition of the DMS is in a passive state during the first time period, transitioning, at an end of the first time period and by the DMS, the first storage partition from the active state to the passive state and the second storage partition from the passive state to the active state, capturing, by the DMS and during a second time period subsequent to the end of the first time period while the first storage partition is in the passive state, a snapshot of the first storage partition, obtaining, by the DMS and during the second time period, one or more second log files from the database, where the one or more second log files are indicative of one or more second respective events associated with the database, and storing, by the DMS and during the second time period, the one or more second log files in the second storage partition based on the second storage partition being in the active state during the second time period.

An apparatus is described. The apparatus may include one or more memories storing processor executable code, and one or more processors coupled with the one or more memories. The one or more processors may individually or collectively be operable to execute the code to cause the apparatus to obtain, by a DMS and during a first time period, one or more first log files from a database, where the one or more first log files are indicative of one or more first respective events associated with the database, store, by the DMS and during the first time period, the one or more first log files in a first storage partition of the DMS based on the first storage partition being in an active state during the first time period, and where a second storage partition of the DMS is in a passive state during the first time period, transition, at an end of the first time period and by the DMS, the first storage partition from the active state to the passive state and the second storage partition from the passive state to the active state, capturing, by the DMS and during a second time period subsequent to the end of the first time period while the first storage partition be in the passive state, a snapshot of the first storage partition, obtain, by the DMS and during the second time period, one or more second log files from the database, where the one or more second log files are indicative of one or more second respective events associated with the database, and store, by the DMS and during the second time period, the one or more second log files in the second storage partition based on the second storage partition being in the active state during the second time period.

Another apparatus is described. The apparatus may include means for obtaining, by a DMS and during a first time period, one or more first log files from a database, where the one or more first log files are indicative of one or more first respective events associated with the database, means for storing, by the DMS and during the first time period, the one or more first log files in a first storage partition of the DMS based on the first storage partition being in an active state during the first time period, and where a second storage partition of the DMS is in a passive state during the first time period, means for transitioning, at an end of the first time period and by the DMS, the first storage partition from the active state to the passive state and the second storage partition from the passive state to the active state, means for capturing, by the DMS and during a second time period subsequent to the end of the first time period while the first storage partition is in the passive state, a snapshot of the first storage partition, means for obtaining, by the DMS and during the second time period, one or more second log files from the database, where the one or more second log files are indicative of one or more second respective events associated with the database, and means for storing, by the DMS and during the second time period, the one or more second log files in the second storage partition based on the second storage partition being in the active state during the second time period.

A non-transitory computer-readable medium storing code is described. The code may include instructions executable by one or more processors to obtain, by a DMS and during a first time period, one or more first log files from a database, where the one or more first log files are indicative of one or more first respective events associated with the database, store, by the DMS and during the first time period, the one or more first log files in a first storage partition of the DMS based on the first storage partition being in an active state during the first time period, and where a second storage partition of the DMS is in a passive state during the first time period, transition, at an end of the first time period and by the DMS, the first storage partition from the active state to the passive state and the second storage partition from the passive state to the active state, capturing, by the DMS and during a second time period subsequent to the end of the first time period while the first storage partition be in the passive state, a snapshot of the first storage partition, obtain, by the DMS and during the second time period, one or more second log files from the database, where the one or more second log files are indicative of one or more second respective events associated with the database, and store, by the DMS and during the second time period, the one or more second log files in the second storage partition based on the second storage partition being in the active state during the second time period.

Some examples of the method, apparatus, and non-transitory computer-readable medium described herein may further include operations, features, means, or instructions for deleting, by the DMS during the second time period and subsequent to capturing the snapshot, the one or more first log files from the first storage partition.

Some examples of the method, apparatus, and non-transitory computer-readable medium described herein may further include operations, features, means, or instructions for transitioning, at an end of the second time period and by the DMS, the second storage partition from the active state to the passive state and the first storage partition from the passive state to the active state, capturing, by the DMS and during a third time period subsequent to the end of the second time period while the second storage partition may be in the passive state, a second snapshot of the second storage partition, obtaining, by the DMS and during the third time period, one or more third log files from the database, where the one or more third log files may be indicative of one or more third respective events associated with the database, and storing, by the DMS and during the third time period, the one or more third log files in the first storage partition based on the first storage partition being in the active state during the third time period.

Some examples of the method, apparatus, and non-transitory computer-readable medium described herein may further include operations, features, means, or instructions for deleting, by the DMS during the first time period and prior to transitioning the second storage partition from the passive state to the active state, one or more prior log files from the second storage partition.

Some examples of the method, apparatus, and non-transitory computer-readable medium described herein may further include operations, features, means, or instructions for transitioning the first storage partition from the active state to the passive state and the second storage partition from the passive state to the active state may be based on a duration of the first time period satisfying a threshold.

In some examples of the method, apparatus, and non-transitory computer-readable medium described herein, the one or more first respective events include one or more additions of files to the database, one or more deletions of files from the database, or one or more modifications of files at the database.

Some examples of the method, apparatus, and non-transitory computer-readable medium described herein may further include operations, features, means, or instructions for storing, by the DMS, the snapshot in a secondary storage environment accessible to the DMS.

Some examples of the method, apparatus, and non-transitory computer-readable medium described herein may further include operations, features, means, or instructions for obtaining, by the DMS and at a first time prior to the first time period, a first snapshot of the database, obtaining, by the DMS and at a second time subsequent to the first time period, a second snapshot of the database, storing, by the DMS, the first snapshot and the second snapshot in the secondary storage environment, and performing a restore operation for the database to a state corresponding to a third time between the first time and the second time based on at least one of the first snapshot of the database and the second snapshot of the database stored in the secondary storage environment and based on the one or more first log files stored in the secondary storage environment.

Some examples of the method, apparatus, and non-transitory computer-readable medium described herein may further include operations, features, means, or instructions for storing, at a first time during the first time period and by the DMS, a first subset of the one or more first log files that may have been obtained by the DMS by the first time in a secondary storage environment accessible to the DMS.

Some examples of the method, apparatus, and non-transitory computer-readable medium described herein may further include operations, features, means, or instructions for storing the first subset of the one or more first log files may be based on a first duration since a beginning of the first time period satisfying a threshold.

Some examples of the method, apparatus, and non-transitory computer-readable medium described herein may further include operations, features, means, or instructions for storing, at a second time during the first time period and by the DMS, a second subset of the one or more first log files that may have been obtained by the DMS by the second time and since the first time in the secondary storage environment.

Some examples of the method, apparatus, and non-transitory computer-readable medium described herein may further include operations, features, means, or instructions for storing the second subset of the one or more first log files may be based on a second duration since the first time satisfying the threshold.

In some examples of the method, apparatus, and non-transitory computer-readable medium described herein, capturing the snapshot may include operations, features, means, or instructions for storing, by the DMS, a remainder of the one or more first log files in the secondary storage environment that may have not already been stored in the secondary storage environment.

In some examples of the method, apparatus, and non-transitory computer-readable medium described herein, capturing the snapshot may include operations, features, means, or instructions for performing deduplication of the one or more first log files stored in the secondary storage environment.

In some examples of the method, apparatus, and non-transitory computer-readable medium described herein, the one or more first log files and the one or more second log files may be obtained in a push manner from the database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining, by a data management system and during a first time period, one or more first log files from a database, wherein the one or more first log files are indicative of one or more first respective events associated with the database;

storing, by the data management system and during the first time period, the one or more first log files associated with a database in a first storage partition of the data management system based at least in part on the first storage partition being in an active state during the first time period, and wherein a second storage partition of the data management system is in a passive state during the first time period, wherein the first storage partition and the second storage partition are backup shares of the data management system;

deleting, by the data management system during the first time period, one or more prior log files from the second storage partition;

transitioning, at an end of the first time period and by the data management system, the first storage partition from the active state to the passive state;

transitioning, at the end of the first time period and by the data management system, the second storage partition from the passive state to the active state such that one of the first storage partition or the second storage partition is in the active state;

capturing, by the data management system and during a second time period subsequent to the end of the first time period while the first storage partition is in the passive state, a snapshot of the first storage partition;

obtaining, by the data management system and during the second time period, one or more second log files from the database, wherein the one or more second log files are indicative of one or more second respective events associated with the database;

deleting, by the data management system during the second time period and subsequent to capturing the snapshot, the one or more first log files from the first storage partition; and storing, by the data management system and during the second time period, the one or more second log files in the second storage partition based at least in part on the second storage partition being in the active state during the second time period.

2. The method of claim 1, further comprising:

transitioning, at an end of the second time period and by the data management system, the second storage partition from the active state to the passive state and the first storage partition from the passive state to the active state;

capturing, by the data management system and during a third time period subsequent to the end of the second time period while the second storage partition is in the passive state, a second snapshot of the second storage partition;

obtaining, by the data management system and during the third time period, one or more third log files from the database, wherein the one or more third log files are indicative of one or more third respective events associated with the database; and storing, by the data management system and during the third time period, the one or more third log files in the first storage partition based at least in part on the first storage partition being in the active state during the third time period.

3. The method of claim 1, wherein transitioning the first storage partition from the active state to the passive state and the second storage partition from the passive state to the active state is based at least in part on a duration of the first time period satisfying a threshold.

4. The method of claim 1, wherein the one or more first respective events comprise one or more additions of files to the database, one or more deletions of files from the database, or one or more modifications of files at the database.

5. The method of claim 1, further comprising:

storing, by the data management system, the snapshot in a storage environment accessible to the data management system.

6. The method of claim 5, further comprising:

obtaining, by the data management system and at prior to the first time period, a first snapshot of the database;

obtaining, by the data management system and subsequent to the first time period, a second snapshot of the database;

storing, by the data management system, the first snapshot and the second snapshot in the storage environment; and performing a restore operation for the database to a state between the first snapshot and the second snapshot based at least in part on at least one of the first snapshot of the database and the second snapshot of the database stored in the storage environment and based at least in part on the one or more first log files stored in the storage environment.

7. The method of claim 1, further comprising:

storing, during the first time period and by the data management system, a first subset of the one or more first log files that have been obtained by the data management system in a storage environment accessible to the data management system.

8. The method of claim 7, wherein storing the first subset of the one or more first log files is based at least in part on a first duration since a beginning of the first time period satisfying a threshold.

9. The method of claim 8, further comprising:

storing, during the first time period and by the data management system, a second subset of the one or more first log files that have been obtained by the data management system after storing the first subset of the one or more first log files in the storage environment.

10. The method of claim 9, wherein storing the second subset of the one or more first log files is based at least in part on a second duration since storing the first subset of the one or more first log files satisfying the threshold.

11. The method of claim 7, wherein capturing the snapshot comprises:

storing, by the data management system, a remainder of the one or more first log files in the storage environment that have not already been stored in the storage environment.

12. The method of claim 11, wherein capturing the snapshot comprises:

performing deduplication of the one or more first log files stored in the storage environment.

13. The method of claim 1, wherein the one or more first log files and the one or more second log files are obtained in a push manner from the database.

14. An apparatus, comprising:

one or more memories storing processor-executable code; and one or more processors coupled with the one or more memories and individually or collectively operable to execute the code to cause the apparatus to:

obtain, by a data management system and during a first time period, one or more first log files from a database, wherein the one or more first log files are indicative of one or more first respective events associated with the database;

store, by the data management system and during the first time period, the one or more first log files associated with a database in a first storage partition of the data management system based at least in part on the first storage partition being in an active state during the first time period, and wherein a second storage partition of the data management system is in a passive state during the first time period, wherein the first storage partition and the second storage partition are backup shares of the data management system;

delete, by the data management system during the first time period, one or more prior log files from the second storage partition;

transition, at an end of the first time period and by the data management system, the first storage partition from the active state to the passive state;

transition, at the end of the first time period and by the data management system, the second storage partition from the passive state to the active state such that one of the first storage partition or the second storage partition is in the active state;

capture, by the data management system and during a second time period subsequent to the end of the first time period while the first storage partition be in the passive state, a snapshot of the first storage partition;

obtain, by the data management system and during the second time period, one or more second log files from the database, wherein the one or more second log files are indicative of one or more second respective events associated with the database;

delete, by the data management system during the second time period and subsequent to capturing the snapshot, the one or more first log files from the first storage partition; and store, by the data management system and during the second time period, the one or more second log files in the second storage partition based at least in part on the second storage partition being in the active state during the second time period.

15. The apparatus of claim 14, wherein the one or more processors are individually or collectively further operable to execute the code to cause the apparatus to:

transition, at an end of the second time period and by the data management system, the second storage partition from the active state to the passive state and the first storage partition from the passive state to the active state;

capture, by the data management system and during a third time period subsequent to the end of the second time period while the second storage partition be in the passive state, a second snapshot of the second storage partition;

obtain, by the data management system and during the third time period, one or more third log files from the database, wherein the one or more third log files are indicative of one or more third respective events associated with the database; and store, by the data management system and during the third time period, the one or more third log files in the first storage partition based at least in part on the first storage partition being in the active state during the third time period.

16. A non-transitory computer-readable medium storing code, the code comprising instructions executable by one or more processors to:

obtain, by a data management system and during a first time period, one or more first log files from a database, wherein the one or more first log files are indicative of one or more first respective events associated with the database;

store, by the data management system and during the first time period, the one or more first log files associated with a database in a first storage partition of the data management system based at least in part on the first storage partition being in an active state during the first time period, and wherein a second storage partition of the data management system is in a passive state during the first time period, wherein the first storage partition and the second storage partition are backup shares of the data management system;

delete, by the data management system during the first time period, one or more prior log files from the second storage partition;

transition, at an end of the first time period and by the data management system, the first storage partition from the active state to the passive state;

transition, at the end of the first time period and by the data management system, the second storage partition from the passive state to the active state such that one of the first storage partition or the second storage partition is in the active state;

capture, by the data management system and during a second time period subsequent to the end of the first time period while the first storage partition be in the passive state, a snapshot of the first storage partition;

obtain, by the data management system and during the second time period, one or more second log files from the database, wherein the one or more second log files are indicative of one or more second respective events associated with the database;

delete, by the data management system during the second time period and subsequent to capturing the snapshot, the one or more first log files from the first storage partition; and store, by the data management system and during the second time period, the one or more second log files in the second storage partition based at least in part on the second storage partition being in the active state during the second time period.

* * * * *